F. C. RONK.
GAGE GLASS.
APPLICATION FILED NOV. 26, 1915.
1,250,664.
Patented Dec. 18, 1917.
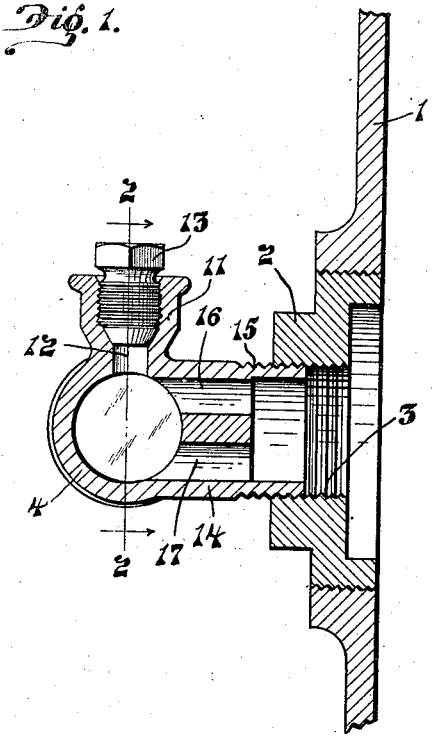
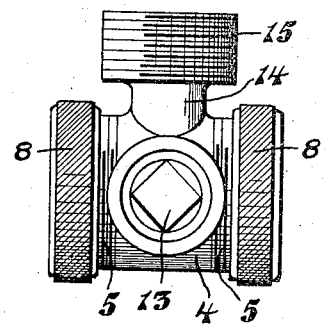
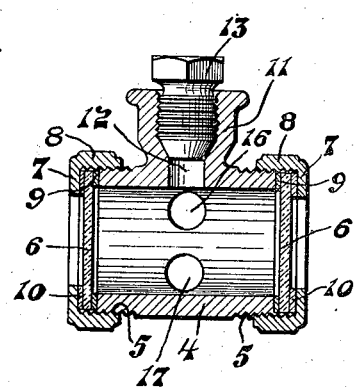
Witness
Robert O. Karcher
Inventor
Frank C. Ronk.
By F. W. Burr
Attorney

UNITED STATES PATENT OFFICE.

FRANK C. RONK, OF CANTON, OHIO.

GAGE-GLASS.

1,250,664.  Specification of Letters Patent. Patented Dec. 18, 1917.

Application filed November 26, 1915. Serial No. 63,352.

*To all whom it may concern:*

Be it known that I, FRANK C. RONK, a citizen of the United States, residing at Canton, in the county of Stark and State of Ohio, have invented a new and useful Gage-Glass, of which the following is a specification.

This invention relates to gage glasses and has more especial reference to a gage glass adapted to be used upon a steam radiator, being especially adapted to the type of steam radiators in which a gas burner or similar means is used for generating the steam in the radiator.

The object of this invention is the production of a combined gage glass and filler.

A further object is the provision of a gage glass which will indicate upon each side the amount of water in the radiator.

A further object is the provision of a gage glass which will be readily applicable to the ordinary form of radiators.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the accompanying drawings:

Figure 1 is a sectional view through the gage glass, showing the same applied to a radiator.

Fig. 2 is a section on the line 2—2, Fig. 1.

Fig. 3 is a top plan view of the gage glass.

Similar numerals of reference indicate corresponding parts throughout the several figures of the drawing.

Referring more especially to the construction illustrated in the accompanying drawings, the numeral 1 indicates a fragmentary portion of the end section of a radiator and the numeral 2 indicates the usual plug which is provided in said section being preferably screw threaded as shown, and provided with internal screw threads 3.

The numeral 4 indicates the barrel portion of the gage, said barrel portion being screw threaded at each extremity as indicated at 5. A cover 6 of glass or other transparent material is clamped against each extremity of the barrel by means of an annular ring 7, said ring being provided with an annular flange 8 having internal screw threads which engage the screw threads 5 upon the barrel, a gasket 9 of rubber or other suitable material being located between the glass and the extremity of the barrel, in order to form a water tight joint, and a gasket 10, preferably of paper or fibrous material, interposed between the glass and ring 7.

An internally screw threaded filling neck 11 is provided upon the barrel portion and communicates with the interior of the barrel by means of the passage-way 12, a screw threaded plug 13 being provided for the purpose of normally closing said filling neck. When the water in the radiator drops below the proper level the plug 13 may be removed and a filling can or funnel provided with a screw threaded spout, is inserted into the filling neck for the purpose of refilling the radiator.

The neck portion 14 extends at right angles to the barrel portion and is connected thereto at a point intermediate the extremities thereof. Screw threads 15 are provided at the extremity of the neck portion by means of which the gage glass is attached to the screw threaded plug 2 of the radiator. Upper and lower parallel, horizontally disposed channels 16 and 17 are formed in the neck portion and communicate with the interior of the barrel.

From the foregoing description it will be seen that I have provided an improved gage glass which will allow the level of the water in the radiator, to which the glass is attached, to be readily determined by viewing the same from either side and I have also provided a glass which can be readily repaired without removing the entire gage from the radiator and replacing a new one therefor.

It will also be seen that by providing the upper and lower passage-ways 16 and 17 in the neck portion, a water inlet and air outlet between the radiator and the water gage will be provided, thus allowing the water in the gage glass to always assume the same level as the water in the radiator.

Further it will be seen that it is not necessary to tap the radiator in two places in order to connect the water gage thereto as is the usual custom, but with the present construction the water gage may be connected to the plug 2 which is provided upon radiators such as are at present in use.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A gage glass comprising a barrel portion, a transparent member extending across each end thereof, means for holding said transparent members to said barrel portion and a neck portion located at right angles to said barrel portion, said neck portion provided with a pair of channels communicating with the interior of said barrel portion.

2. In combination with a radiator having a wall provided with a screw threaded aperture, a gage glass comprising a barrel portion having a sight opening at each end thereof, a transparent plate closing each of said sight openings, and a screw threaded neck portion located at right angles to said barrel portion and arranged to be attached within the screw threaded aperture in said radiator wall, said neck portion provided with a pair of spaced channels communicating with the interior of said barrel portion and said radiator.

In testimony that I claim the above, I have hereunto subscribed my name.

FRANK C. RONK.

Copies of this patent may be obtained for five cents each, by addressing the "Commissioner of Patents, Washington, D. C."